(12) United States Patent
Lin et al.

(10) Patent No.: US 9,615,212 B1
(45) Date of Patent: Apr. 4, 2017

(54) METHOD, DEVICE, AND SYSTEM FOR COLLECTING AND REPORTING MINIMALLY NECESSARY REAL-TIME PERSONAL CONTEXT

(71) Applicant: MOTOROLA SOLUTIONS, INC, Schaumburg, IL (US)

(72) Inventors: Lin Lin, Fox River Grove, IL (US); Deepak P. Raj, Hanover Park, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 1 day.

(21) Appl. No.: 14/883,145

(22) Filed: Oct. 14, 2015

(51) Int. Cl.
*H04W 4/02* (2009.01)
*H04L 12/26* (2006.01)

(52) U.S. Cl.
CPC .......... *H04W 4/025* (2013.01); *H04L 43/067* (2013.01)

(58) Field of Classification Search
CPC ........................ H04W 4/025; H04L 43/067
See application file for complete search history.

(56) References Cited

U.S. PATENT DOCUMENTS

| | | | |
|---|---|---|---|
| 7,088,220 B2 | 8/2006 | Kotzin | |
| 8,681,984 B2 | 3/2014 | Lee et al. | |
| 8,793,063 B2 | 7/2014 | Horvitz et al. | |
| 8,793,340 B2 | 7/2014 | Faure et al. | |
| 2002/0103622 A1 | 8/2002 | Burge | |
| 2006/0098088 A1 | 5/2006 | Raghunath | |
| 2011/0237287 A1* | 9/2011 | Klein | H04M 3/42178 455/521 |
| 2015/0254968 A1 | 9/2015 | Sanders et al. | |

OTHER PUBLICATIONS

The International Search Report and the Written Opinion, SN: PCT/US2016/055399, Filed : Oct. 5, 2016, mailed: Dec. 5, 2016, all pages.

* cited by examiner

*Primary Examiner* — Chuong A Ngo (57) ABSTRACT

A wireless computing device collects and reports minimally necessary real-time personal context of a user. During a first period of time, collecting and storing one or more first personal context information elements associated with the user but not reporting them via wireless transmission. In response to determining that there is an increased probability of an incident occurring near the user, for a second period of time: continuing to collect the first personal context information elements and reporting them all via wireless transmission, and beginning collecting and storing second personal context information elements not collected during the first period of time but not reporting second personal context information elements via wireless transmission.

18 Claims, 4 Drawing Sheets

METHOD, DEVICE, AND SYSTEM FOR COLLECTING AND REPORTING MINIMALLY NECESSARY REAL-TIME PERSONAL CONTEXT

BACKGROUND OF THE INVENTION

As the market for the "Internet of Things" continues to advance, and sensors and information they collect becomes more prevalent, concerns regarding privacy and information overload begin to arise. This is especially true for the connected first responder user as sensor information associated with the first responder him or herself, e.g., personal context information including locationing, biometrics, and other sensors, may be particularly sensitive and may raise privacy concerns. Further, as the number of sensors and other context information that is possible to collect on and around a first responder increases and becomes more prevalent, the need to distill this load of context information into smaller actionable pieces of information becomes greater, as first responders and dispatchers who may receive this information are commonly called on to act on the collected information in a very quick manner, and the stakes involved with the decision to act or not act are commonly high.

Thus, there exists a need for an improved method, device, and system for collecting and reporting a minimum amount of real-time personal context associated with a user.

BRIEF DESCRIPTION OF THE SEVERAL VIEWS OF THE DRAWINGS

The accompanying figures, where like reference numerals refer to identical or functionally similar elements throughout the separate views, which together with the detailed description below are incorporated in and form part of the specification and serve to further illustrate various embodiments of concepts that include the claimed invention, and to explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Disclosed is an improved method, device, and system for collecting and reporting a minimum amount of real-time personal context associated with a user.

In one embodiment a method for collecting and reporting minimally necessary real-time personal context of a user includes: collecting and storing, by a wireless computing device during a first period of time, one or more first personal context information elements associated with the user but not reporting the one or more first personal context information elements associated with the user via wireless transmission; making a first determination, by the wireless computing device via the one or more first personal context information elements or via wireless reception, that there is an increased probability of an incident occurring near the user and, for a second period of time after the first determination: continuing to collect, by the wireless computing device, the one or more first personal context information elements and reporting the one or more first personal context information elements collected during the first and second periods of time via wireless transmission; and collecting and storing, by the wireless computing device, one or more second personal context information elements not collected during the first period of time but not reporting the one or more second personal context information elements via wireless transmission.

In a further embodiment, a wireless computing device for collecting and reporting minimally necessary real-time personal context includes: one or more wireless transceivers; a data store; and one or more processors configured to: collect and store, in the data store, one or more first personal context information elements associated with the user but not reporting the one or more first personal context information elements associated with the user via wireless transmission using the one or more wireless transceivers; make a first determination, via the one or more first personal context information elements or via wireless reception over the one or more wireless transceivers, that there is an increased probability of an incident occurring near the user and, for a second period of time after the first determination: continue to collect the one or more first personal context information elements and report the one or more first personal context information elements collected during the first and second periods of time via wireless transmission using the one or more wireless transceivers; and collect and store, in the data store, one or more second personal context information elements not collected during the first period of time but not reporting the one or more second personal context information elements via wireless transmission using the one or more wireless transceivers.

Each of the above-mentioned embodiments will be discussed in more detail below, starting with example network and device architectures of the system in which the embodiments may be practiced, followed by an illustration of processing steps for achieving collection and reporting of a minimum amount of real-time personal context associated with a user from a wireless computing device perspective. Further advantages and features consistent with this disclosure will be set forth in the following detailed description, with reference to the figures.

1. System Architecture and Device Structure

Figure 1:
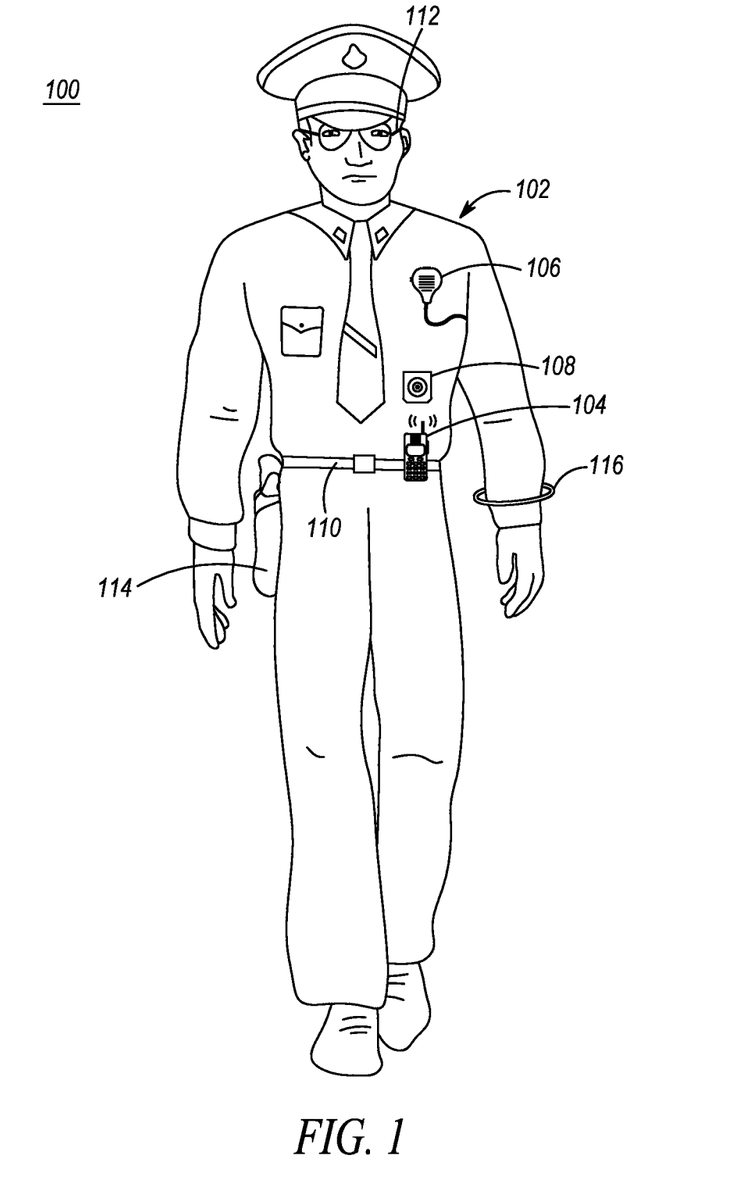
FIG. 1 is a system diagram illustrating a first responder user wearing a wireless computing device and a plurality of personal context information element generating devices that implement improved collection and reporting of a minimum amount of real-time personal context associated with the user in accordance with some embodiments.

Referring now to the drawings, and in particular FIG. 1, a system diagram illustrates a system 100 of wireless and/or wired devices that a user 102 (illustrated in FIG. 1 as a first responder) may wear, including a primary wireless computing device 104 (depicted in FIG. 1 as a mobile radio) used for narrowband and/or broadband communications, a remote speaker microphone (RSM) 106, a video camera 108, a biometric sensor device 110, a pair of smart glasses 112, a weapon status sensor 114, and a mobility tracker 116.

The wireless computing device 104 may be any wireless device used for infrastructure-supported media (e.g., voice, audio, video, etc.) communication via a long-range wireless transmitter (e.g., in comparison to a short-range transmitter such as a Bluetooth, Zigbee, or NFC transmitter) and/or transceiver with other mobile radios in a same or different group of mobile radios as the wireless computing device 104. The long-range transmitter may have a transmit range on the order of miles, e.g., 0.5-50 miles, or 3-20 miles. While in this disclosure the wireless computing device 104 is described as an integrated computing device for storing personal context information elements (PCIEs) associated with the user first responder 102 and for reporting the information to an infrastructure via a wireless transmitter, in other embodiments, the two functions may be divided into separate devices communicatively coupled via a wired or wireless connection as well.

In the example of FIG. 1, the wireless computing device 104 forms the hub of communication connectivity for the user first responder 102, through which PCIEs associated with the user first responder 102 and generated by the wireless computing device 104 itself or by other sensors directly or wirelessly coupled to the wireless computing device 104 are collected, stored, and/or reported in accordance with the disclosure set forth herein.

In order to communicate with PCIE-generating sensors, which may be integrated with the wireless computing device 104 or incorporated into separate distinct accessory devices, the wireless computing device 104 may contain one or more internal electronic busses for communicating with sensors integrated in or on the wireless computing device 104 itself, may contain one or more physical electronic ports (such as a USB port, an Ethernet port, an audio jack, etc.) for direct electronic coupling with another wireless accessory device, and/or may contain a short-range transmitter (e.g., in comparison to the long-range transmitter such as a LMR or Broadband transmitter) and/or transceiver for wirelessly coupling with another wireless accessory device. The short-range transmitter may be a Bluetooth, Zigbee, or NFC transmitter having a transmit range on the order of 0.01-100 meters, or 0.1-10 meters.

Accessory devices 106-116 communicate with the wireless computing device 104 via their own direct electronic coupling or short-range transmitter and/or transceivers, and provide particularized PCIEs to the wireless computing device 104.

For example, the RSM 106 may act as a remote microphone that is closer to the user first responder's 102 mouth, and under certain conditions, may record the user first responder's 102 words and/or ambient sounds and provide the recorded audio or text-transcription of the recorded audio (filtered or un-filtered) as a PCIE to the wireless computing device 104. Although not relevant to generation of PCIEs, a speaker may also be provided in the RSM 106 unit such that audio and/or voice received at the wireless computing device 104 is transmitted to the RSM 106 and played back closer to the user first responder's 102 ear.

The video camera 108 may be an always-on device or an activated-on-demand video capture device that provides video and/or audio, filtered or un-filtered, to the wireless computing device 104 as a PCIE to the wireless computing device 104.

The biometric sensor device 110 may be a device capable of sensing biometric data of its wearer, such as heart rate, body temperature, etc., and may provide the biometric data, filtered or un-filtered, as a PCIE to the wireless computing device 104. Additionally or alternatively, an environmental sensor may be provided on or at the sensor device 110 to detect environmental parameters such as oxygen levels, temperature, radiation, etc., and may provide the environmental data, filtered or un-filtered, as a PCIE to the wireless computing device 104.

The smart glasses 112 may maintain a bi-directional connection with the wireless computing device 104 and provide an always-on or on-demand video feed pointed in a direction of the first responder's gaze, and in a filtered or un-filtered state, back to the wireless computing device 104 as a PCIE. Although not relevant to generation of PCIEs, the smart glasses 112 may also provide a personal display via a projection mechanism integrated into the smart glasses 112 for displaying information such as text, images, or video received from the wireless computing device 104. In some embodiments, an additional user interface mechanism such as a touch interface may be provided on the smart glasses 112 that allows the user first responder 102 to interact with the display elements displayed on the smart glasses 112.

The weapon status sensor 114 may maintain state information regarding a weapon normally holstered within the user first responder's 102 weapon holster. The weapon status sensor may detect a change in state (presence to absence) and/or an action (removal) relative to a weapon normally holstered within the holster to which the sensor is coupled. The detected change in state and/or action may be reported to the wireless computing device 104 as a PCIE. In some embodiments, the weapon status sensor 114 may also detect whether the first responder's hand is resting on the weapon even if it has not yet been removed from the holster and provide such information as a PCIE to wireless computing device 104. Other possibilities exist as well.

The mobility tracker 116 device may include one or more movement sensors (such as an accelerometer, magnetometer, and/or gyroscope) that may periodically or intermittently provide to the wireless computing device 104 indications of direction, steps, acceleration, and/or speed, perhaps accompanying other additional information, as PCIEs. An accelerometer is a device that measures acceleration. Single and multi-axis models are available to detect magnitude and direction of the acceleration as a vector quantity, and can be used to sense orientation, acceleration, vibration shock, and falling. A gyroscope is a device for measuring or maintaining orientation, based on the principles of conservation of angular momentum. One type of gyroscope, a microelectromechanical system (MEMS) based gyroscope, uses lithographically constructed versions of one or more of a tuning fork, a vibrating wheel, or resonant solid to measure orientation. Other types of gyroscopes could be used as well. A magnetometer is a device used to measure the strength and/or direction of the magnetic field in the vicinity of the device, and can be used to determine a direction in which a person or device is facing. Other types of movement sensors could additionally, or alternatively, be used as well. Although the mobility tracker 116 is shown in FIG. 1 as a bracelet worn around the wrist, in other examples, the mobility tracker 116 may be worn around another part of the body, or may take a different physical form including an earring, a finger ring, a necklace, or some other type of wearable form factor.

Figure 2:
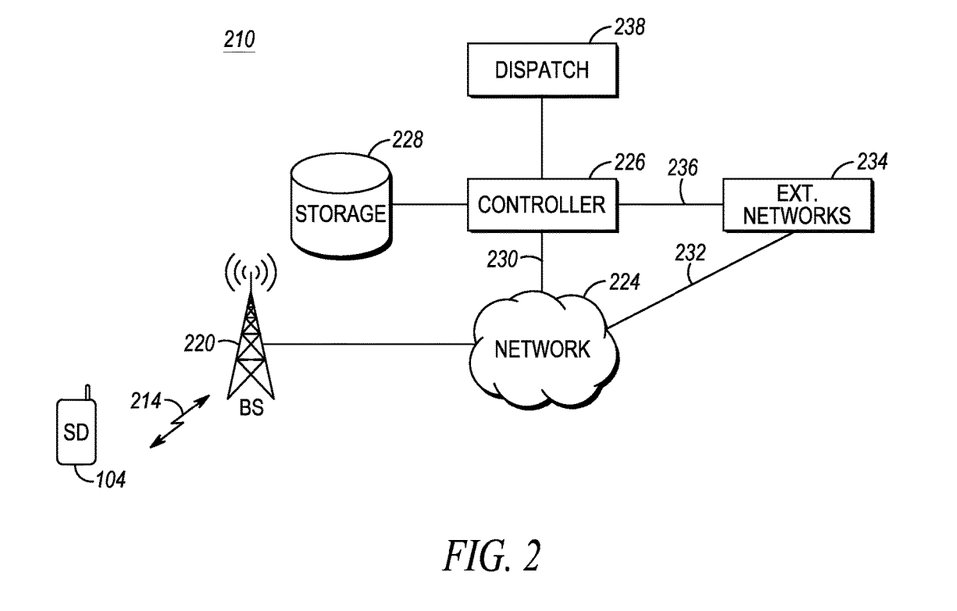
FIG. 2 is a system diagram illustrating an infrastructure wireless network for supporting reporting of a minimum amount of real-time personal context associated with a user in accordance with some embodiments.

FIG. 2 is a system diagram illustrating an infrastructure wireless communication network for supporting wireless communication device reporting of a minimum amount of real-time personal context associated with a user in accordance with some embodiments. In particular, FIG. 2 illustrates an infrastructure wireless communications network 210 including a wireless computing device 104, fixed terminal 220 (e.g. a repeater, base transceiver station (BTS) or eNodeB, hereinafter referred to as a base station (BS)), wireless link(s) 214, backhaul network 224, radio controller device 226, storage 228, communications connections 230, 232, 236, dispatch console 238, and external networks 234. The BS 220 has at least one radio transmitter covering a radio coverage cell (not shown). One or several mobile radios within radio coverage of the BS 220 may connect to the BS 220 using a wireless communication protocol via wireless link(s) 214. The wireless computing device 104 may communicate with other mobile radios and with devices in the infrastructure 210 (such as dispatch console 238), and perhaps other devices accessible external networks, using a group communications protocol over the wireless link(s) 214. The wireless link(s) 214 may include one or both of an uplink channel and a downlink channel, and may include one or more physical channels or logical channels. Wireless link(s) 214 may implement, for example, a conventional or trunked land mobile radio (LMR) standard or protocol such as ETSI Digital Mobile Radio (DMR), Project 25 (P25) standard defined by the Association of Public Safety Communications Officials International (APCO), or other radio protocols or standards. In other embodiments, wireless link(s) 214 may additionally or alternatively implement a Long Term Evolution (LTE) protocol including multimedia broadcast multicast services (MBMS), an open mobile alliance (OMA) push to talk (PTT) over cellular (OMA-PoC) standard, a voice over IP (VoIP) standard, or a PTT over IP (PoIP) standard. Other types of wireless protocols could be implemented as well.

Communications in accordance with any one or more of these protocols or standards, or other protocols or standards, may take place over physical channels in accordance with one or more of a TDMA (time division multiple access), FDMA (frequency divisional multiple access), OFDMA (orthogonal frequency division multiplexing access), or CDMA (code division multiple access) protocol. Mobile radios in RANs such as those set forth above send and receive media streams (encoded portions of voice, audio, and/or audio/video streams) in a call in accordance with the designated protocol.

In the example of FIG. 1, wireless link(s) 214 are established between wireless computing device 104 and BS 220 for transmission of a wireless computing device 104 or other device-sourced call including a media stream (e.g., formatted bursts, packets, messages, frames, etc. containing digitized audio and/or video representing a portion of an entire call, among other possible signaling and/or other payload data) to one or more target devices (not shown), perhaps belonging to a same subscribed group or talkgroup of mobile radios as the source wireless computing device 104.

The wireless computing device 104 may be configured with an identification reference (such as an International Mobile Subscriber Identity (IMSI) or MAC address) which may be connected to a physical media (such as a Subscriber Identity Module (SIM) card). The wireless computing device 104 may be a group communications device, such as a push-to-talk (PTT) device, that is normally maintained in a monitor only mode, and which switches to a transmit-only mode (for half-duplex devices) or transmit and receive mode (for full-duplex devices) upon depression or activation of a PTT input switch. The group communications architecture in infrastructure wireless communications network 210 allows a single mobile radio, such as wireless computing device 104, to communicate with one or more group members (not shown) associated with a particular group of mobile radios at the same time.

Although only a single controller device 226 is illustrated in FIG. 1, more than one controller device 226 may be used and/or a distributed controller device 226 may be used that divides functions across multiple devices, perhaps for load balancing reasons. Finally, while storage 228 is illustrated as directly coupled to controller device 226, storage 228 may also be disposed remote from controller device 226 and accessible to controller device 226 via one or more of network 224 and/or external networks 234.

Controller device 226 may be, for example, a call controller, PTT server, zone controller, evolved packet core (EPC), mobile management entity (MME), radio network controller (RNC), base station controller (BSC), mobile switching center (MSC), site controller, Push-to-Talk controller, or other network device for controlling and distributing calls amongst mobile radios via respective BSs. The controller device 226 may further be configured to provide registration, authentication, encryption, routing, and/or other services to BS 220 so that mobile radios operating within its coverage area may communicate with other mobile radios in the communications system.

The BS 220 may be linked to the controller device 226 via one or both of network 224 and communications connection 230. Network 224 may comprise one or more routers, switches, LANs, WLANs, WANs, access points, or other network infrastructure. For example, controller device 226 may be accessible to BS 220 via a dedicated wireline or via the Internet. In one example, BS 220 may be directly coupled to controller device 226 via one or more internal links under control of a single communications network provider.

Storage 228 may function to store PCIE information reported from mobile radios for evidentiary purposes, for access by a dispatcher at dispatch console 238, for access by other mobile radios via BS 220 and/or other BSs (not shown), or for other reasons.

The one-to-many group communication structure may be implemented in communications network 210 in a number of ways and using any one or more messaging protocols, including multiple unicast transmissions (each addressed to a single group member wireless computing device), single multicast transmissions (addressed to a single group or multiple groups), single broadcast transmissions (the broadcast transmission perhaps including one or more group identifiers that can be decoded and matched by the receiving wireless computing devices), or any combination thereof.

External networks 234 may also be accessible to BS 220 (and thus wireless computing device 104) via network 224 and communications connection 232 and/or controller device 226 and communications connections 230, 236. External networks 234 may include, for example, a public switched telephone network (PSTN), the Internet, or another wireless service provider's network, among other possibilities.

Dispatch console 238 may be directly coupled to controller device 226 as shown, or may be indirectly coupled to controller device 226 via one or more of network 224 and external networks 234, or some other network device in network 224.

Figure 3:
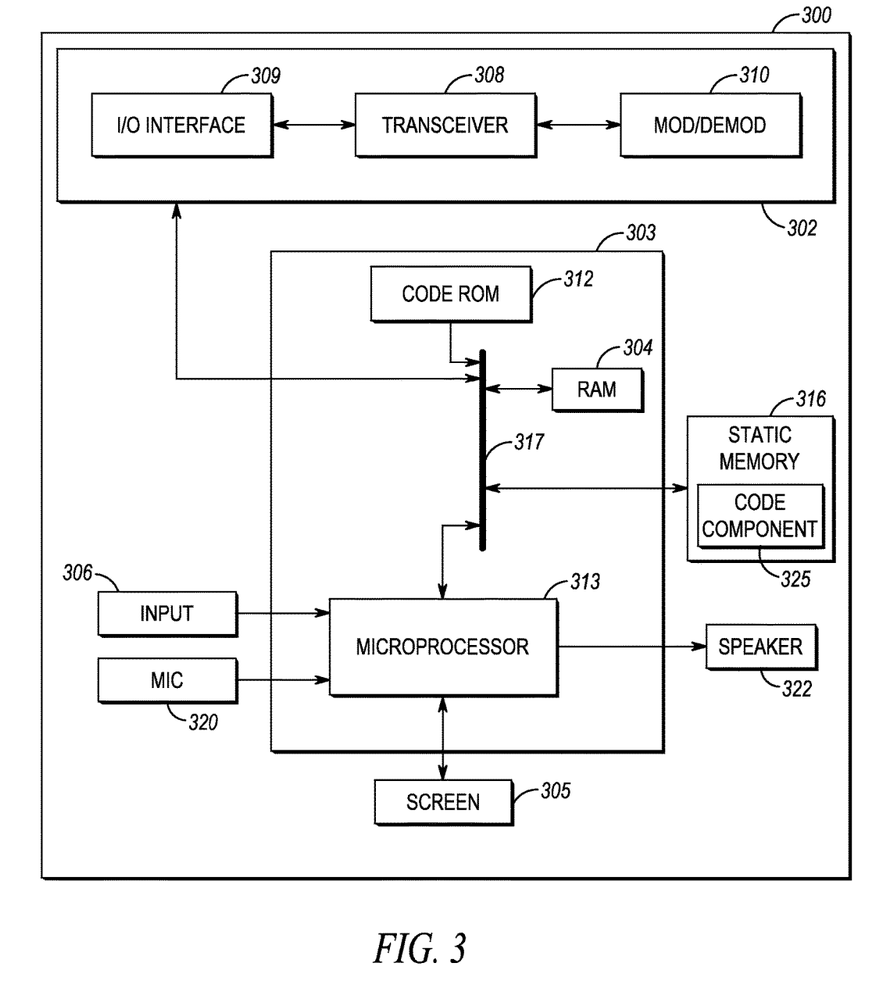
FIG. 3 is a device diagram showing a device structure of the wireless computing device of FIG. 1 in accordance with some embodiments.

Referring to FIG. 3, a schematic diagram illustrates a wireless computing device 300 according to some embodiments of the present disclosure. Wireless computing device 300 may be, for example, the same as or similar to the wireless computing device 104 of FIGS. 1 and 2. As shown in FIG. 3, wireless computing device 300 includes a communications unit 302 coupled to a common data and address bus 317 of a processing unit 303. The wireless computing device 300 may also include an input unit (e.g., keypad, pointing device, etc.) 306 and a display screen 305, each coupled to be in communication with the processing unit 303.

A microphone 320 captures audio from a user that is further vocoded by processing unit 303 and transmitted as voice stream data by communication unit 302 to other mobile radios and/or other devices via the network 224. A communications speaker 322 reproduces audio that is decoded from voice streams of voice calls received from other mobile radios and/or from an infrastructure device via the communications unit 302.

The processing unit 303 may include a code Read Only Memory (ROM) 312 coupled to the common data and address bus 317 for storing data for initializing system components. The processing unit 303 may further include an electronic microprocessor 313 coupled, by the common data and address bus 317, to a Random Access Memory (RAM) 304 and a static memory 316.

The communications unit 302 may include one or more wired or wireless input/output (I/O) interfaces 309 that are configurable to communicate with networks 224 via BSs 220, with other mobile radios, and/or with accessory devices 106-116.

The communications unit 302 may include one or more wireless transceivers 308, such as a DMR transceiver, a P25 transceiver, a Bluetooth transceiver, a Wi-Fi transceiver perhaps operating in accordance with an IEEE 802.11 standard (e.g., 802.11a, 802.11b, 802.11g), a WiMAX transceiver perhaps operating in accordance with an IEEE 802.16 standard, and/or other similar type of wireless transceiver configurable to communicate via a wireless radio network. The communications unit 302 may additionally or alternatively include one or more wireline transceivers 308, such as an Ethernet transceiver, a Universal Serial Bus (USB) transceiver, a Tip, Ring, Sleeve (TRS) connection, a Tip, Ring, Ring, Sleeve (TRRS) connection, or similar transceiver configurable to communicate via a twisted pair wire, a coaxial cable, a fiber-optic link, an audio jack, or a similar physical connection to a wireline network. The transceiver 308 is also coupled to a combined modulator/demodulator 310.

The microprocessor 313 has ports for coupling to the input unit 306 and the microphone unit 320, and to the display screen 305 and speaker 322. Static memory 316 may store operating code for the microprocessor 313 that, when executed, performs one or more of the wireless computing device processing, transmitting, and/or receiving steps set forth in FIG. 4 and accompanying text. Static memory 316 may also store, permanently or temporarily, PCIE information disclosed herein as being generated at wireless computing device 300 or provided via the communications unit 302 and collected at the wireless computing device 300.

Static memory 316 may comprise, for example, a hard-disk drive (HDD), an optical disk drive such as a compact disk (CD) drive or digital versatile disk (DVD) drive, a solid state drive (SSD), a tape drive, a flash memory drive, or a tape drive, to name a few.

2. Processes for Collecting and Reporting a Minimum Amount of Real-Time Personal Context Assoicated With a User Turning now to FIG. 4, a flow chart sets forth process steps 400 for improved collection and reporting of a minimum amount of real-time personal context associated with a user in accordance with some embodiments.

Figure 4:
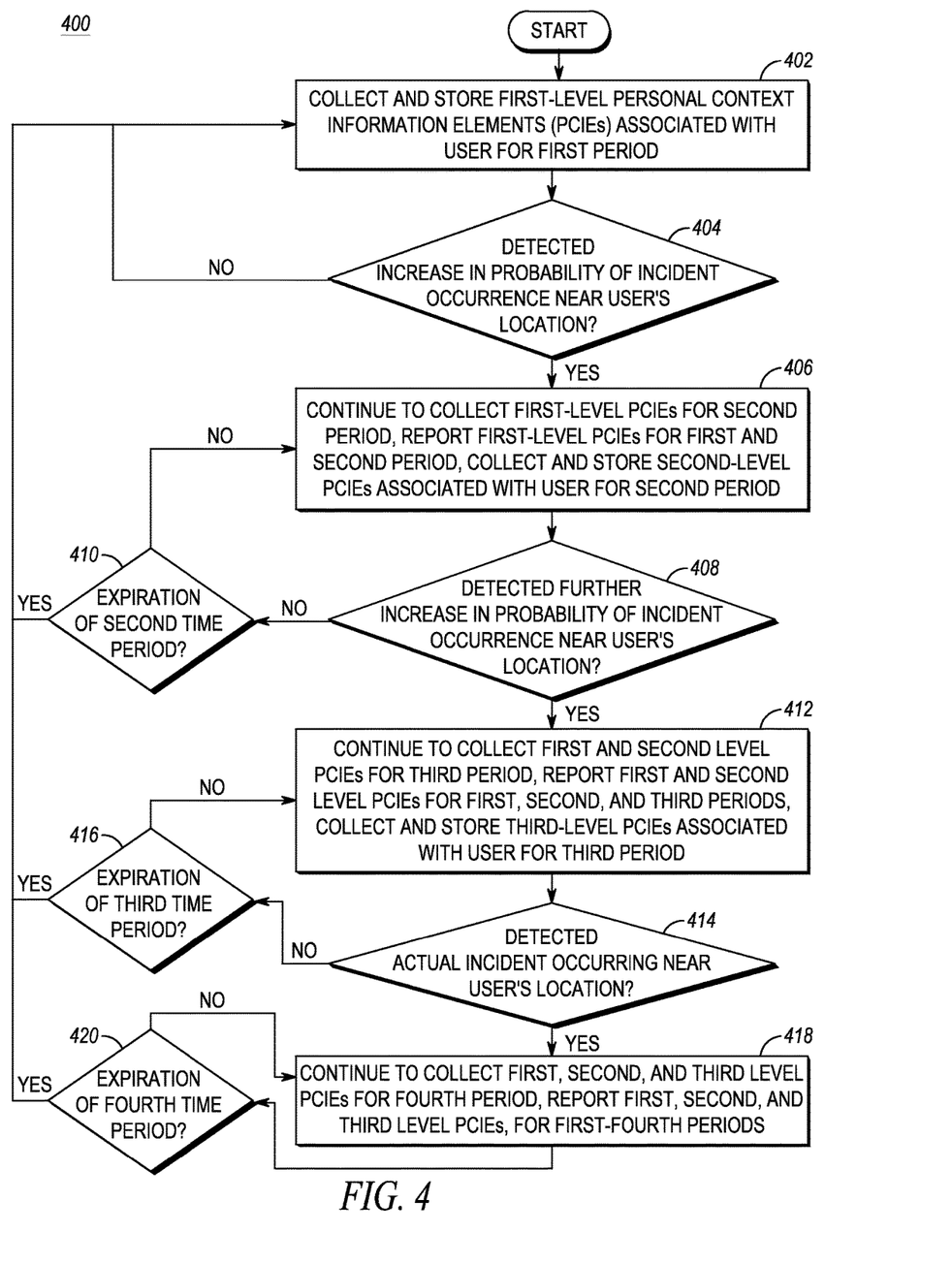
FIG. 4 illustrates a flow chart setting forth process steps for improved collection and reporting of a minimum amount of real-time personal context associated with a user in accordance with some embodiments.

Process 400 begins at step 402, where a wireless computing device such as wireless computing device 104/300 collects and stores first-level PCIEs associated with a user for a first period of time. First-level PCIEs are user-context elements considered to be of low-privacy impact and are collected and stored regardless of any heightened probability of a future incident occurring near the user's location. First-level PCIEs may be pre-configured at the wireless computing device, or set via an over-the-air provisioning process, and may include context elements such as, but not limited to, location information collected via a location sensor, presence information collected via a presence sensor, and weapon status information collected via a weapon status sensor, among other possibilities.

The wireless computing device may collect the first-level PCIEs from sensors integrated into the wireless computing device itself, such as but not limited to a global positioning system (GPS) location sensor and a presence information status switch or input indicating an online/offline or on-the-clock/off-the-clock status indicator or similar status. Additionally or alternatively, the wireless computing device may collect the first-level PCIEs from sensors external to the wireless computing device itself and provided to the radio via a direct electronic connection or via a wireless connection, such as but not limited to an external weapon status sensor wiredly or wirelessly coupled to the wireless computing device. The collected first-level PCIEs may be stored in a local storage of the wireless computing device such as static memory 316 of wireless computing device 300. The first-level PCIEs are stored locally at step 402 and are not reported to the infrastructure network 210 via wireless transmission. In some embodiments, the collected first-level PCIEs may be conditioned and validated prior to storage.

At step 404, the wireless computing device determines whether there is an increase in probability of an incident occurring near the user's current location. The determination of an increase in probability of an incident occurring near the user's current location is not a detection of an actual occurrence of an incident near the user's current location (e.g., an actual robbery, high-speed chase, hostage situation, etc.), but instead, is a determination via analytics and/or context that there is a heightened probability of a future occurrence of an actual incident near the user's current location. The determination may be made by the wireless computing device itself, or may be made in the infrastructure 210 and reported to the wireless computing device via wireless link(s) such as wireless link(s) 214 of FIG. 2.

In one embodiment, the determination may be made as a function of the collected first-level PCIEs. For example, the wireless computing device may maintain or be provided with a set of geofence definitions identifying geographic areas that have historically experienced higher crime rates than other lower crime areas. When a PCIE collected from a GPS sensor in the wireless computing device indicates that the wireless computing device has passed into one of these higher crime geographic areas, the wireless computing device may determine that there is now a heightened probability of an incident occurring near the user's current location. In some embodiments, the determination may be based on a plurality of PCIEs, such as a determination that the first responder is on-the-clock (presence information), has also passed into a higher crime geographic area, has placed his or her hand on their weapon, and/or a time of day information indicates a lack of lighting (e.g., nighttime).

Additionally or alternatively, information provided to the wireless computing device via the infrastructure (e.g., via wireless link(s) 214) may, alone or in combination with PCIE information collected at the wireless computing device, cause the wireless computing device to determine that there is a heightened probability of an incident occurring near the user's current location. For example, the infrastructure may transmit a notification that some actual incident has already occurred several miles away (and thus not near the user), however, the first responder/wireless computing device is within a search area or an escape path from the actual incident. In another example, the infrastructure may transmit a notification, in response to the wireless computing device reporting its location, that the wireless computing device has entered a high crime area. The information provided via the infrastructure may be sufficient on its own to cause the wireless computing device to determine that there is a heightened probability of an incident occurring near the user's current location, or the wireless computing device may make such as determination using the infrastructure information and the collected PCIE information in combination.

If the wireless computing device determines that there is no increase in probability of an incident occurring near the user's current location, processing returns to step 402 where first-level PCIEs are continued to be collected and stored by the wireless computing device. On the other hand, if the wireless computing device determines at step 404 that there is an increase in probability of an incident occurring near the user's current location, processing proceeds to step 406.

At step 406, the wireless computing device continues to collect and store first-level PCIEs associated with the user for a second period of time. Because there is a determined heightened probability of a future occurrence of an incident near the user's location, the wireless computing device takes two actions, including, for the second period of time: (i) beginning collecting and storing second-level PCIEs associated with the user and (ii) reporting the first level PCIEs previously collected and stored during the first period of time and reporting the first level PCIEs that the wireless computing device continues to collect.

The second-level PCIEs are user-context elements considered to be of somewhat higher privacy impact than the low-privacy impact user-context elements collected and stored during the first period of time. Similar to first level PCIEs, second-level PCIEs may be pre-configured at the wireless computing device, or set via an over-the-air provisioning process, and may include context elements such as, but not limited to, mobility information associated with the user. The second-level PCIEs may be collected and stored in a similar manner to the first-level PCIEs, and may be similarly sourced from sensors integrated into the wireless computing device or via external accessory devices communicatively coupled to the wireless computing device. At step 406, the collected second-level PCIEs are stored locally and are not reported to the infrastructure network 210 via wireless transmission. In some embodiments, the collected second-level PCIEs may be conditioned and validated prior to storage.

As noted above, at step 406 the first-level PCIEs collected and stored during the first period of time are reported to the infrastructure. For example, wireless computing device 104 in FIG. 2 may wirelessly transmit first-level PCIEs collected and stored during the first period of time to infrastructure 210 via wireless link(s) 214, for further storage at infrastructure storage 228 and/or display at dispatch console 238. By collecting first-level PCIEs prior to the determination at step 404, additional context information leading up to the determination at step 404 can be provided to the infrastructure for such diverse uses as analytics, crime scene re-creation, etc. Also, any additional first-level PCIEs that are collected during the second period of time are also provided to the infrastructure.

At step 408, the wireless computing device determines whether there is a further increase in probability of an incident occurring near the user's current location. The determination of a further increase in probability of an incident occurring near the user's current location, again, is not a detection of an actual occurrence of an incident near the user's current location, but instead, is a determination via analytics and/or context that there is a further heightened probability of a future occurrence of an actual incident near the user's current location. The determination may be made by the wireless computing device itself, or may be made in the infrastructure 210 and reported to the wireless computing device via wireless link(s) such as wireless link(s) 214 of FIG. 2.

In one embodiment, the determination may be made as a function of the collected first and/or second-level PCIEs. For example, when a second-level PCIE collected from a mobility sensor indicates that the user is accelerating or running, the wireless computing device may determine that there is now a further-heightened probability of an incident occurring near the user's current location. In some embodiments, the determination may be based on a plurality of first and/or second PCIEs, such as a determination that the first responder is near a festival with high density of civilians and a weapon status sensor indicates that the user's hand has been placed on the weapon but not yet removed from the holster.

Additionally or alternatively, information provided to the wireless computing device via the infrastructure (e.g., via wireless link(s) 214) may, alone or in combination with PCIE information collected at the wireless computing device, cause the wireless computing device to determine that there is a further heightened probability of an incident occurring near the user's current location. The information provided via the infrastructure may be sufficient on its own to cause the wireless computing device to determine that there is a further heightened probability of an incident occurring near the user's current location, or the wireless computing device may make such a determination using the infrastructure information and the collected PCIE information in combination.

If the wireless computing device determines that there is no further increase in probability of an incident occurring near the user's current location, processing proceeds to step 410, where the wireless computing device determines whether the second time period has expired. The second time period may be preconfigured at the wireless computing device, or may be set via an over-the-air provisioning from the infrastructure. The second time period may be, for example, in the range of 1-20 minutes or 5-10 minutes. If the second time period has not yet expired, processing proceeds back to step 406. On the other hand, if the second time period has expired, processing proceeds back to step 402. In some embodiments, expiration of the second time period may also cause the wireless computing device to erase any second-level PCIEs collected and stored during the second period (and not yet reported to the infrastructure). This maintains the privacy of the user while still maintaining the ability to provide a limited history of second-level PCIE information to the infrastructure if further circumstances warrant it. In other embodiments, the second-level PCIEs collected and stored during the second period may be retained at the wireless computing device for a threshold period of time (e.g., 1-24 hours) past expiration of the second time period, or may be retained indefinitely until manually deleted by the user.

On the other hand, if the wireless computing device determines at step 408 that there is a further increase in probability of an incident occurring near the user's current location, processing proceeds to step 412.

At step 412, the wireless computing device continues to collect and store first and second-level PCIEs associated with the user for a third period of time. Because there is a determined further heightened probability of a future occurrence of an incident near the user's location, the wireless computing device takes two actions, including, for the third period of time: (i) beginning collecting and storing third-level PCIEs associated with the user and (ii) reporting the first and second level PCIEs previously collected and stored during the first and second periods of time and reporting the first and second-level PCIEs that the wireless computing device continues to collect.

The third-level PCIEs are user-context elements considered to be of a highest privacy impact relative to the low-privacy impact user-context elements and higher-privacy impact user-context elements collected and stored during the first and second periods of time. Similar to first and second-level PCIEs, third-level PCIEs may be preconfigured at the wireless computing device, or set via an over-the-air provisioning process, and may include context elements such as, but not limited to, biometric readings associated with the user, among other possibilities. The third-level PCIEs may be collected and stored in a similar manner to the first and second-level PCIEs, and may be similarly sourced from sensors integrated into the wireless computing device or via external accessory devices communicatively coupled to the wireless computing device. At step 412, the collected third-level PCIEs are stored locally and are not reported to the infrastructure network 210 via wireless transmission. In some embodiments, the collected third-level PCIEs may be conditioned and validated prior to storage.

As noted above, at step 412 the first and second-level PCIEs collected and stored during the first and second periods of time are reported to the infrastructure. For example, wireless computing device 104 in FIG. 2 may wirelessly transmit first and second-level PCIEs collected and stored during the first and second periods of time to infrastructure 210 via wireless link(s) 214, for further storage at infrastructure storage 228 and/or display at dispatch console 238. By collecting second-level PCIEs prior to the determination at step 408, additional context information leading up to the determination at step 408 can be provided to the infrastructure for such diverse uses as analytics, crime scene re-creation, etc. Also, any additional first and second-level PCIEs that are collected during the third period of time are also reported to the infrastructure. Because the first-level PCIEs collected during the first and second periods of time were already reported to the infrastructure at step 406, the wireless computing device may refrain from re-reporting such first-level PCIEs at step 412, or may simply re-report such first-level PCIEs at step 412 accompanying the additional PCIEs reported at step 412.

At step 414, the wireless computing device determines whether there is an actual detected incident occurring near the user's current location. The determination of an actual incident occurring near the user's current location may be made by the wireless computing device itself, or may be made in the infrastructure 210 and reported to the wireless computing device via wireless link(s) such as wireless link(s) 214 of FIG. 2.

In one embodiment, the determination that there is an actual detected incident occurring near the user's current location may be made as a result of a user interface input at the wireless computing device operated by the user. For example, the user may operate input 306 of wireless computing device 300 illustrated in FIG. 3 to indicate that an incident has actually occurred, perhaps after witnessing or being informed of an actual incident, such as a robbery or hostage situation, in the vicinity of the user. In other embodiments, an accessory device coupled to the wireless computing device, such as the RSM 106, may detect a voice instruction or contextual audio that may trigger an indication of an actual incident occurring, such as the user speaking a ten-code associated with a particular type of incident occurring near the user.

Additionally or alternatively, information provided to the wireless computing device via the infrastructure (e.g., via wireless link(s) 214) may, alone or in combination with local triggers at the wireless computing device, cause the wireless computing device to determine that there is an actual incident occurring near the user's current location. The information provided via the infrastructure may be sufficient on its own to cause the wireless computing device to determine that there is an actual incident occurring near the user's current location, and may take the form of a data message indicating the type of incident and perhaps including additional information such as location or a description of suspects involved. In other examples, the information provided via the infrastructure may be a dispatcher's voice indicating occurrence of a particular incident near the user, which may be automatically recognized by the wireless computing device to trigger an incident occurrence, or which may be received by the user of the wireless computing device, whom may then toggle an input of the wireless computing device to indicate occurrence of an incident. Other possibilities exist as well.

If the wireless computing device determines that there is no actual incident occurring near the user's current location, processing proceeds to step 416, where the wireless computing device determines whether the third time period has expired. The third time period may be preconfigured at the wireless computing device, or may be set via an over-the-air provisioning from the infrastructure. The third time period may be, for example, in the range of 1-20 minutes or 5-10 minutes. If the third time period has not yet expired, processing proceeds back to step 412. On the other hand, if the third time period has expired, processing proceeds back to step 402, or in some cases not shown in FIG. 4, back to step 406 (in which case the second time period may be reset to an initial value). In some embodiments, expiration of the third time period may also cause the wireless computing device to erase any third-level PCIEs collected and stored during the third period (and not yet reported to the infrastructure). This maintains the privacy of the user while still maintaining the ability to provide a limited history of third-level PCIE information to the infrastructure if further circumstances warrant it. In other embodiments, the third-level PCIEs collected and stored during the third period may be retained at the wireless computing device for a threshold period of time (e.g., 1-24 hours) past expiration of the third time period, or may be retained indefinitely until manually deleted by the user.

On the other hand, if the wireless computing device determines at step 414 that there is an actual incident occurring near the user's current location, processing proceeds to step 418.

At step 418, the wireless computing device continues to collect and store first, second, and third-level PCIEs associated with the user for a fourth period of time. Because there is a determined actual incident occurring near the user's location, the wireless computing device takes two actions, including, for the fourth period of time: (i) reporting the first, second, and third-level PCIEs previously collected and stored during the first, second, and third periods of time and (ii) reporting the first, second, and third-level PCIEs that the wireless computing device continues to collect. For example, wireless computing device 104 in FIG. 2 may wirelessly transmit first, second, and third-level PCIEs collected and stored during the first, second, and third periods of time to infrastructure 210 via wireless link(s) 214, for further storage at infrastructure storage 228 and/or display at dispatch console 238. By collecting third-level PCIEs prior to the determination at step 414, additional context information leading up to the determination at step 414 can be provided to the infrastructure for such diverse uses as analytics, crime scene re-creation, etc. Also, any additional first, second, and third-level PCIEs that are collected during the fourth period of time are also reported to the infrastructure. Because the first and second-level PCIEs collected during the first, second, and third periods of time were already reported to the infrastructure at steps 406 and/or 412, the wireless computing device may refrain from re-reporting such first and second-level PCIEs at step 418, or may simply re-report such first and second-level PCIEs at step 418 accompanying the additional PCIEs reported at step 418.

Processing then proceeds from step 418 to step 420, where the wireless computing device determines whether the fourth time period has expired. The fourth time period may be preconfigured at the wireless computing device, may be set via an over-the-air provisioning from the infrastructure, or may be set to last indefinitely until the user indicates via a user interface of accessory device that the incident has ended and/or until information received via the infrastructure indicates that the incident has ended. If not indefinite, the fourth time period may be, for example, in the range of 5-120 minutes or 10-30 minutes. If the fourth time period has not yet expired (automatically or manually via user or infrastructure input), processing proceeds back to step 418. On the other hand, if the fourth time period has expired, processing proceeds back to step 402, or in some cases not shown in FIG. 4, back to step 412 (in which case the third time period may be reset to an initial value). In some embodiments, expiration of the fourth time period may also cause the wireless computing device to report any first, second, or third-level PCIEs to the infrastructure prior to erasing any first, second, or third-level PCIEs still locally stored at the wireless computing device. This maintains the privacy of the user in a shared-radio environment, where the wireless computing device may be handed off to another user in the future. In other embodiments, the first, second, and third-level PCIEs collected and stored at the wireless computing device may be retained at the wireless computing device for a threshold period of time (e.g., 1-24 hours) past expiration of the fourth time period, or may be retained indefinitely until manually deleted by the user.

Although the above description provides examples of particular PCIEs at particular first, second, and third levels, various network owners may configure a different mix of PCIEs and may assign various PCIEs disclosed herein to different levels, and the above description is not intended to be limiting in any way, but instead, to give some examples of possible hierarchical structures of PCIEs.

Further, although there is a gradual iteration in heightened probabilities of incident occurrence illustrated in FIG. 4 from steps 404 to 418, in other embodiments, a detected actual incident at step 414 may in some embodiments take the place of step 408, and processing may continue directly from step 406 to step 414 and to step 418. Other variations are possible as well.

3. Conclusion

In accordance with the foregoing, an improved method, device, and system for collecting and reporting a minimum amount of real-time personal context associated with a user is disclosed. As a result of the foregoing, a user of the wireless computing device may be assured of improved privacy protection and constraints. Further, the user and/or dispatcher may be provided with a reduced amount of context information overall, and with more relevant context information depending on a determined likelihood of an incident or occurrence of an actual incident, allowing a first responder user or dispatcher who may receive this information to act on the collected information in a quicker and more confident manner. Other advantages and benefits are possible as well.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized electronic processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising an electronic processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for collecting, storing, and reporting real-time personal context of a user, the method comprising:
    collecting and storing, by a wireless computing device during a first period of time, one or more first personal context information elements associated with the user but not reporting the one or more first personal context information elements associated with the user via wireless transmission;
    making a first determination, by the wireless computing device via the one or more first personal context information elements or via wireless reception, that there is an increased probability of an incident occurring near the user and, for a second period of time after the first determination:
        continuing to collect, by the wireless computing device, the one or more first personal context information elements and reporting the one or more first personal context information elements collected during the first and second periods of time via wireless transmission; and
        collecting and storing, by the wireless computing device, one or more second personal context information elements not collected during the first period of time but not reporting the one or more second personal context information elements via wireless transmission;
    wherein the first determination comprises one or more of: (i) a determination that a number of nearby first responders exceeds a threshold number of nearby first responders, (ii) a determination that a time of day and/or day of week is associated with a historically higher probability of an incident occurring, (iii) a determination that a current weather condition is associated with a historically higher probability of an incident occurring, (iv) a determination that a current location of the user is near a musical, news, or political event, (v) a determination that a current location of the user is near another user pre-identified as high-importance, and (vi) a determination that an activity state of the user has increased.

2. The method of claim 1, further comprising:
    making a second determination, by the wireless computing device via the one or more first or second personal context information elements, via a detected external event, or via wireless reception, that there is an actual incident occurring near the user and, for a third period of time after the second determination:
        continuing to collect by the wireless computing device, the one or more first and second personal context information elements and reporting the one or more first and second personal context information elements collected during the first, second, and third periods of time via wireless transmission.

3. The method of claim 1, wherein the first personal context information elements comprise context elements having a lower privacy impact relative to second personal context information elements having a higher privacy impact.

4. The method of claim 3, wherein the first personal context information elements comprise a location of the user, and the second personal context information elements comprise a mobility state of the user.

5. The method of claim 1, wherein the first determination comprises a determination, as a function of a first personal context information element comprising a location of the user, that the location of the user is a location associated with a historically higher probability of an incident occurring.

6. The method of claim 1, further comprising:
making a second determination, by the wireless computing device via the one or more first or second personal context information elements, via a detected external event, or via wireless reception, that there is a further increased probability of an incident occurring near the user and, for a third period of time after the second determination:
continuing to collect by the wireless computing device, the one or more first and second personal context information elements and reporting the one or more first and second personal context information elements collected during the first, second, and third periods of time via wireless transmission; and
collecting and storing, by the wireless computing device, one or more third personal context information elements associated with the user not collected during the first or second periods of time but not reporting the one or more third personal context information elements via wireless transmission.

7. The method of claim 6, further comprising:
making a third determination, by the wireless computing device via the one or more first, second, or third personal context information elements, via a detected external event, or via wireless reception, that there is an actual incident occurring near the user and, for a fourth period of time after the third determination:
continuing to collect by the wireless computing device, the one or more first, second, and third personal context information elements and reporting the one or more first, second, and third personal context information elements collected during the first, second, third, and fourth periods of time via wireless transmission.

8. The method of claim 7, wherein the first personal context information elements comprise context elements having a lower privacy impact including a location of the user, the second personal context information elements comprise context elements having a higher privacy impact including a mobility state of the user, and the third personal context information elements comprise context elements having a still higher privacy impact including biological readings of the user.

9. The method of claim 7, wherein the third determination that an actual incident is occurring comprises determining that the user's weapon has been pulled out from its holster or that a weapon in a vicinity of the user has been discharged.

10. The method of claim 6, wherein the first and second determinations are different and are selected from a list consisting of: (i) a determination that a number of nearby first responders exceeds a threshold number of nearby first responders, (ii) a determination that a time of day and/or day of week is associated with a historically higher probability of an incident occurring, (iii) a determination that a current weather condition is associated with a historically higher probability of an incident occurring, (iv) a determination that a current location of the user is near a musical, news, or political event, (v) a determination that a current location of the user is near another user pre-identified as high-importance, (vi) a determination that a current location of the user is associated with a historically higher probability of an incident occurring, and (vii) a determination that an activity state of the user has increased.

11. The method of claim 6, wherein the third period of time is a predetermined period of time, and after expiration of the third period of time without a third determination that there is a still further increased probability of an incident occurrence, at least temporarily halting collecting the one or more third personal context information elements and halting reporting the one or more second personal context information elements via wireless transmission.

12. The method of claim 1, wherein the second period of time is a predetermined period of time, and after expiration of the second period of time without a second determination that there is a further increased probability of an incident occurrence, at least temporarily halting collecting the one or more second personal context information elements and halting reporting the one or more first personal context information elements via wireless transmission.

13. A wireless computing device for collecting, storing, and reporting real-time personal context of a user, the device comprising:
one or more wireless transceivers;
a data store; and
one or more electronic processors configured to:
collect and store, in the data store, one or more first personal context information elements associated with the user but not reporting the one or more first personal context information elements associated with the user via wireless transmission using the one or more wireless transceivers;
make a first determination, via the one or more first personal context information elements or via wireless reception over the one or more wireless transceivers, that there is an increased probability of an incident occurring near the user and, for a second period of time after the first determination:
continue to collect the one or more first personal context information elements and reporting the one or more first personal context information elements collected during the first and second periods of time via wireless transmission using the one or more wireless transceivers; and
collect and store, in the data store, one or more second personal context information elements not collected during the first period of time but not reporting the one or more second personal context information elements via wireless transmission using the one or more wireless transceivers,
wherein the first determination comprises one or more of: (i) a determination that a number of nearby first responders exceeds a threshold number of nearby first responders, (ii) a determination that a time of day and/or day of week is associated with a historically higher probability of an incident occurring, (iii) a determination that a current weather condition is associated with a historically higher probability of an incident occurring, (iv) a determination that a current location of the user is near a musical, news, or political event, (v) a determination that a current location of the user is near another user pre-identified as high-importance, and (vi) a determination that an activity state of the user has increased.

14. The wireless computing device of claim 13, wherein the first personal context information elements comprise context elements having a lower privacy impact relative to second personal context information elements having a higher privacy impact.

15. The wireless computing device of claim 14, wherein the first personal context information elements comprise a location of the user, and the second personal context information elements comprise a mobility state of the user.

16. The wireless computing device of claim 13, wherein the first determination comprises a determination, as a function of a first personal context information element comprising a location of the user, that the location of the user is a location associated with a historically higher probability of an incident occurring.

17. The wireless computing device of claim 13, wherein the second period of time is a predetermined period of time, and wherein the set of functions further comprise:
  after expiration of the second period of time without a second determination that there is a further increased probability of an incident occurrence, at least temporarily halting collecting the one or more second personal context information elements and halting reporting the one or more first personal context information elements via wireless transmission.

18. A non-transitory computer readable media storing instructions that, when executed by a processor, perform a set of functions for collecting, storing, and reporting real-time personal context of a user, the set of functions comprising:
  collecting and storing, in a data store, one or more first personal context information elements associated with the user but not reporting the one or more first personal context information elements associated with the user via wireless transmission;
  making a first determination, via the one or more first personal context information elements or via wireless reception, that there is an increased probability of an incident occurring near the user and, for a second period of time after the first determination:
    continuing to collect the one or more first personal context information elements and reporting the one or more first personal context information elements collected during the first and second periods of time via wireless transmission; and
    collect and store, in the data store, one or more second personal context information elements not collected during the first period of time but not reporting the one or more second personal context information elements via wireless transmission;
  wherein the first determination comprises one or more of: (i) a determination that a number of nearby first responders exceeds a threshold number of nearby first responders, (ii) a determination that a time of day and/or day of week is associated with a historically higher probability of an incident occurring, (iii) a determination that a current weather condition is associated with a historically higher probability of an incident occurring, (iv) a determination that a current location of the user is near a musical, news, or political event, (v) a determination that a current location of the user is near another user pre-identified as high-importance, and (vi) a determination that an activity state of the user has increased.

\* \* \* \* \*